United States Patent
Pollock et al.

(10) Patent No.: US 9,577,479 B2
(45) Date of Patent: Feb. 21, 2017

(54) IMPROVEMENTS FOR FLUX SWITCHING MACHINES

(75) Inventors: Charles Pollock, Oakham (GB); Helen Pollock, Oakham (GB)

(73) Assignee: TECHNELEC LTD., Oakham (GB)

( * ) Notice: Subject to any disclaimer, the term of this patent is extended or adjusted under 35 U.S.C. 154(b) by 466 days.

(21) Appl. No.: 14/007,322

(22) PCT Filed: Mar. 26, 2012

(86) PCT No.: PCT/GB2012/050671
§ 371 (c)(1),
(2), (4) Date: Oct. 31, 2013

(87) PCT Pub. No.: WO2012/131353
PCT Pub. Date: Oct. 4, 2012

(65) Prior Publication Data
US 2014/0062267 A1    Mar. 6, 2014

(30) Foreign Application Priority Data
Mar. 25, 2011 (GB) .................................. 1105063.0

(51) Int. Cl.
*H02K 1/22* (2006.01)
*H02P 25/08* (2016.01)
*H02K 19/06* (2006.01)

(52) U.S. Cl.
CPC . *H02K 1/22* (2013.01); *H02P 6/26* (2016.02); *H02P 25/08* (2013.01); *H02K 19/06* (2013.01)

(58) Field of Classification Search
CPC ........... H02K 19/06; H02K 1/22; H02P 25/08; H02P 6/008; H02P 6/26
(Continued)

(56) References Cited

U.S. PATENT DOCUMENTS 3,956,678 A * 5/1976 Byrne .................... H02K 1/246
                                                                310/168
4,663,551 A   5/1987 Weh et al.
(Continued)

FOREIGN PATENT DOCUMENTS

GB   EP 1783891 A1 * 5/2007 ............ H02P 25/088
GB       2454170 A    5/2009
(Continued)

OTHER PUBLICATIONS

Translation of foreign document JP 2004096808 (Year: 2004).*
(Continued)

*Primary Examiner* — Alex W Mok
(74) *Attorney, Agent, or Firm* — Fenwick & West LLP

(57) ABSTRACT

Disclosed herein is a design for flux switching machines with one or more armature windings which can deliver controlled torque, in either selected direction on start up, without the use of a mechanical position sensor. Flux switching machines without sensors can operate equally well in either direction. The invention discloses design features for such machines which improves the torque profile of the motor with angle. In three phase machines this delivers higher torque and lower ripple torque. In single phase flux switching machines the invention allows the rotor to be placed in a position where maximum torque can be delivered in either direction by selection of either positive or negative armature current. Rotor slotting is introduced to create a path of low permeability across a rotor tooth with minimal impact on the normal torque producing flux paths. Asymmetry of stator slots is used to further create a stable rotor position when energized by predominantly field means or armature means. Starting of the rotor from this stable position can be achieved in either direction. The method is suitable for starting permanent magnet flux switching motors. The invention results in low cost single phase
(Continued)

motors which can start and run in either direction and three phase flux switching motors with improved performance over the prior art.

15 Claims, 11 Drawing Sheets

(58) Field of Classification Search
USPC .................. 310/68 D, 154.01, 195, 49.46
See application file for complete search history.

(56) References Cited

U.S. PATENT DOCUMENTS

| | | | | |
|---|---|---|---|---|
| 5,256,923 A | * | 10/1993 | Bartos | H02K 29/14 310/106 |
| 5,345,131 A | * | 9/1994 | Torok | H02K 19/06 310/181 |
| 6,788,020 B1 | | 9/2004 | Pollock et al. | |
| 2005/0156475 A1 | * | 7/2005 | Ramu | H02K 19/103 310/166 |
| 2009/0160391 A1 | * | 6/2009 | Flynn | H02K 21/44 318/701 |
| 2010/0072832 A1 | * | 3/2010 | Zhu | H02K 21/44 310/49.46 |
| 2010/0123426 A1 | * | 5/2010 | Nashiki | H02K 1/12 318/701 |
| 2010/0259112 A1 | * | 10/2010 | Chung | H02K 16/00 310/12.18 |
| 2011/0181135 A1 | * | 7/2011 | Pollock | H02K 19/103 310/49.46 |

FOREIGN PATENT DOCUMENTS

| | | | | |
|---|---|---|---|---|
| GB | 2454171 A | | 5/2009 | |
| GB | 2455122 A | | 6/2009 | |
| GB | 2455123 A | * | 6/2009 | ............... H02P 6/10 |
| JP | 2004096808 A | | 3/2004 | |
| WO | WO 2004/025822 A1 | | 3/2004 | |
| WO | WO 2010/015819 A2 | | 2/2010 | |

OTHER PUBLICATIONS

Chen, Y. et al., "Starting Torque of Single-Phase Flux-Switching Permanent Magnet Motors", IEEE Transactions on Magnetics, Oct. 2006, pp. 3416-3418, vol. 42, No. 10.
Cheng, Y. et al., "A Permanent Magnet Flux Switching Motor for Low Energy Axial Fans," Fourtieth IAS Annual Meeting Conference Record, IEEE, Oct. 2005, pp. 2168-2175, vol. 3, 2-6.
Hoang, E. et al., "Switching Flux Permanent Magnet Polyphased Synchronous Machines," Proc. 7th Eur. Conf. Power Electron. Appl., 1997, pp. 903-908, vol. 3.
Pollock, H. et al., "Low Cost, High Power Density, Flux Switching Machines and Drives for Power Tools", in IEEE IAS Annual Meeting, 2003, 7 pages.
Pollock, C. et al., "Flux Switching Motors for Automotive Applications," IEEE Transactions in Industry Applications, Sep./Oct. 2006, pp. 1177-1184, vol. 42 No. 5.
Rauch, S.E. et al., "Design Principles of Flux-Switch Alternators," AIEE Trans., Dec. 1955, pp. 1261-1268, vol. PAS-74.
PCT International Search Report and Written Opinion, Application No. PCT/GB2012/050671 dated May 28, 2013, 11 pages.
GB Search Report, Application No. 1105063.0, dated Jul. 26, 2011, 1 page.

* cited by examiner

1

IMPROVEMENTS FOR FLUX SWITCHING MACHINES

RELATED APPLICATIONS

This application is a 35 U.S.C. 371 national stage filing of International Application No. PCT/GB2012/050671, filed on Mar. 26, 2012, which claims priority to United Kingdom Patent Application No. 1105063.0, filed on Mar. 25, 2011.

TECHNICAL FIELD

This invention relates to flux switching machines. More particularly, the invention is related to, though not limited to, improvements to the rotor and stator design to improve torque variation with angle.

BACKGROUND

Brushless permanent magnet and reluctance motors can be used in many applications, since they do not require the use of commutators or brushes in supplying electrical power to the rotor of the motor. Since these components are subject to significant wear, it is highly desirable to avoid their use. The rotors of flux switching machines have salient teeth with no windings or permanent magnets. These rotors are therefore simple to manufacture and very robust. They are suitable for many applications including very high speed electrical machines.

FIG. 1 shows a flux switching machine with 8 stator teeth and 4 rotor teeth as described in U.S. Pat. No. 6,788,020. This motor contains a field winding in slots 1,3,5,7 of the stator 10 and an armature winding in slots 2,4,6,8 of the stator 10. The rotor, 11, is a salient pole rotor made from laminated steel with 4 rotor teeth, 9. This motor operates with direct current in the field winding and alternating current in the armature winding. The direct current in the field winding creates a four pole stator flux pattern which links the armature winding in a positive or negative direction as the rotor turns from alignment with stator teeth 21,23, 25,27 to alignment with stator teeth 22,24,26,28. This alternating flux linking the armature generates an internal EMF in the armature. The machine can be used as a motor or generator by controlling the armature current to be in phase (motor) or out of phase (generator) with the armature EMF. This machine provides a simple and easy to manufacture structure and gives excellent control flexibility with easy variation of both field current and armature current.

The operation of the flux switching machine has been described in published papers. In a paper "Low cost high power density, flux switching machines and drives for power tools", in IEEE IAS Annual Meeting 2003 by H. Pollock, C. Pollock, R. Walter and B. Gorti, the operation of the machine with field winding in both series and shunt configurations relative to the armature switching circuit is described. In a paper "Flux switching machines for automotive applications" by C. Pollock, H. Pollock, R. Barron, J. Coles, D. Moule, A. Court, R. Sutton, published in IEEE Transactions in Industry Applications Vol. 42 No. 5, September 2006, pp 1177-1184, the operation of the machine as a motor with bifilar armature windings is described. The flux switching motor of FIG. 1 and those described in these published papers are single phase flux switching motors, having a field winding and a single electromagnetic armature carrying alternating current.

FIG. 2 shows a further single phase flux switching machine, also from the prior art, as described in a paper "A permanent magnet flux switching motor for low energy axial fans", Y. Cheng; C. Pollock and H. Pollock; Fortieth IAS Annual Meeting Conference Record, Volume 3, 2-6 Oct. 2005 Page(s):2168-2175. This motor is the four pole version of a two pole machine first described in a paper "Design principles of flux switch alternator," S. E. Rauch and L. J. Johnson, AIEE Trans., vol. PAS-74, pp. 1261-1268, 1955. The stator 30 of FIG. 2 employs four permanent magnet sections 31,33,35 and 37 interspersed between four laminated stator sections 32, 34, 36 and 38 each carrying a slot for the armature winding. As in the motor of FIG. 1 rotation of the rotor 11 causes a cyclical variation in the flux linking the armature winding and hence induces an EMF in the armature winding. The EMF is proportional to speed and unlike the machine in FIG. 1 the field flux produced by the permanent magnets cannot be altered significantly as there is no field winding. The machine of FIG. 2 therefore provides a machine of high efficiency since the magnetic field is produced without copper losses in a field winding. Flux switching machines which incorporate field windings and permanent magnets are also possible as disclosed in UK Patent Applications 0721074.3 and 0721077.6.

Operation of all the prior art single phase flux switching machines including those shown in FIGS. 1 and 2 as a motor or as a generator requires the current in the armature winding to alternate in synchronism with the internal EMF induced within the armature winding due to the field flux. Armature current would be controlled during a positive and negative conduction block, the frequency of current reversals from a positive armature conduction block to a negative armature conduction block determined by the required speed of rotation of the rotor and the magnitude of the current in each armature conduction block determined by the torque requirement of the load, or may be simply limited by the speed of rotation of the machine and the size of the internal armature EMF.

FIG. 3 shows flux plots of a single phase flux switching motor according to the prior art. In each flux plot only the field winding is excited to observe the variation in field flux with position. In FIG. 3(a) the rotor teeth are in a position where they bridge the four stator slots containing the energised field winding. In FIG. 3(b) the rotor teeth are aligned with one group of four stator teeth. In FIG. 3(c) the rotor teeth are in a position where they bridge the four stator slots containing the un-energised armature winding. In all three plots the flux linking the field winding is relatively constant irrespective of rotor position.

FIG. 4 shows a plot of the variation in self and mutual inductance in the field and armature windings of a typical prior art single phase flux switching machine such as the one shown in FIG. 1. The graph shows Line 82 which is the self inductance in pH per turn and per meter of stack length for the field winding is also the self inductance of the armature winding. Since both the field winding and the armature winding span two stator teeth and both span one rotor pole pitch the flux linking the winding due to its own current is relatively constant. The small variation with rotor angle can be explained by variations due to fringing at the edges of the teeth. The graph also shows Line 81 which is the mutual inductance between field winding and armature winding in pH, per turn per m. The mutual inductance is strongly position dependent varying from a positive maximum near to 0° to a negative maximum near to 45°.

The torque in a flux switching motor with a single armature phase is given by:

$$T = \frac{1}{2}i_a^2\frac{dL_a}{d\theta} + \frac{1}{2}i_f^2\frac{dL_f}{d\theta} + i_a i_f \frac{dM}{d\theta} \quad (1)$$

As the windings of a flux switching machine are pitched over two stator teeth and span one rotor tooth pitch, the self inductance of the windings in the flux switching machine are relatively constant. There is therefore little torque produced by the variation in self inductance. The rate of change in mutual inductance creates the possibility for torque production so the torque in a flux switching machine with armature and field windings can be approximated by:

$$T = i_a i_f \frac{dM}{d\theta} \quad (2)$$

Therefore when the rate of change of mutual inductance with respect to increasing rotor angle is positive, and if field current and armature current are both positive, then positive torque will be produced. Positive torque will act to turn the rotor to positive increasing angle.

When the rate of change of mutual inductance with respect to increasing rotor angle is negative, field current is positive but armature current is negative, then positive torque will again be produced. Positive torque will act to turn the rotor to positive increasing angle.

However, if the polarity of the armature current were opposite in each of the above situations the direction of the torque would be reversed and the negative torque would act to turn the rotor in the opposite direction. A single phase flux switching motor can therefore produce torque in either direction and rotate in either direction dependent on the timing and direction of the armature current relative to rotor position.

FIG. 5 shows the torque vs. angle for a prior art flux switching motor with a single armature phase with positive and negative armature currents showing how a continuous stream of positive torque pulses (each lasting 45°) can be produced by alternating the armature current direction. Swapping the armature current polarity in each 45° block could produce a stream of negative torque pulses driving the motor in the opposite direction.

WO 2004/025822 discloses a single phase flux switching motor in which switching of the polarity of voltage pulses applied to the armature coils of the motor can be controlled without the use of a mechanical rotor position sensor. Since a flux switching motor has field coils and armature coils, each with a pitch double that of stator teeth, the magnetic fields generated in one coil link through an adjacent coil. As a result of this overlap, there is significant mutual inductance between the armature and field coils, the mutual inductance being dependent upon the rotational position of the rotor. This enables the rotational position of the rotor to be determined by monitoring voltages induced in the field windings as a result of current flow in the armature windings. The methods disclosed in the prior art for detecting the position of the rotor without a physical position sensor on the rotor are very successful but there is no sensorless method in the prior art to confirm the direction of rotation, or more importantly to guarantee the direction of rotation of the motor from the start.

Rotor designs based on asymmetric rotors have partially addressed this problem by ensuring that if a rotor is in a position of maximum field to armature coupling in one polarity (rotor teeth aligned with one set of stator teeth), then from this position, reversal of the armature current will create a torque in the required direction to start the motor with the required direction determined by the leading edge of the rotor asymmetry. The rotor shown in FIG. 2 has an asymmetric profile which will ensure that it will rotate anti-clockwise if armature excitation polarity is reversed after holding the rotor in a parking position associated with a first polarity of armature current.

In the paper "Starting Torque of Single-Phase Flux-Switching Permanent Magnet Motors", IEEE Transactions on Magnetics, Vol. 42, No. 10, October 2006, the authors demonstrate the problems of starting the single phase flux switching motor. The solution offered in the paper requires an asymmetric rotor and can only deliver guaranteed starting in one direction and under conditions where the position of the rotor is known at startup to ensure the correct polarity of armature current is selected. The further difficulties of guaranteeing motor starting direction without a sensor were not addressed.

Rotor asymmetry is not always desirable. It is known that adding the asymmetry to the rotor can reduce the peak torque. Furthermore, a delay time is required on starting while the rotor settles in a parked position before the other armature current direction will definitely start in the correct direction as any residual rotor oscillation could be enough to favour the wrong running direction. This is particularly a problem since the torque produced by the second armature polarity is small when the rotor teeth are aligned with the stator teeth associated with the first armature polarity. FIG. 5 shows that with excitation of −50 A the rotor could come to rest at 45°, providing there are no external torques. At this point, applying +50 A of armature current would produce a small positive torque taking the rotor in the preferred direction. However, external load could change the parking position and result in incorrect direction at start up. Once moving, it is impractical to detect and reverse the direction of rotation if a sensor is not on the shaft. As a result of these problems flux switching machines with a single electromagnetic armature have had to use a sensor to confirm direction or, if sensorless in operation, have been restricted to applications where the direction of rotation was not critical.

Flux switching machines with a field winding and three armature phases have been proposed as a way of overcoming the starting difficulties of the single phase flux switching motor. Indeed the torque output from a three phase flux switching machine excited by sinusoidal excitation can be smooth with no large torque dips or reversals as described in PCT/GB2009/001921. Three phase flux switching machines with permanent magnets creating the field are described in "Switching flux PM polyphased synchronous machines," in Proc. 7th Eur. Conf. Power Electron. Appl., 1997, vol. 3, pp. 903-908.

SUMMARY

Disclosed herein is a design for improvement of the torque profiles of flux switching machines with one or more armature windings which can deliver controlled torque, in either selected direction on start up, without the use of a mechanical position sensor.

An electrical machine is disclosed for converting electrical energy into mechanical energy and/or mechanical energy into electrical energy, the machine comprising a stator and a rotor, the stator having a field means for the creation of field flux and an armature means comprising at least one armature winding positioned in slots between stator teeth, the stator teeth radially directed towards the air-gap between stator and rotor, the rotor having teeth radially directed towards the air-gap between rotor and stator, at least two of the rotor teeth being manufactured to have different permeabilities parallel to or perpendicular to the air-gap, such that stator flux entering the rotor tooth from the air-gap sees a high reluctance in paths parallel to the air-gap and a low reluctance path in paths radial to the air-gap.

Optionally, the width of the gap across the stator armature slot openings at the air-gap surface is different to the gap across the stator field slots.

Disclosed herein is an electrical machine in which the armature means has only one armature phase, there is provided a means of creating an imbalance between the armature and field excitation levels causing the rotor to move to a position where significant starting torque is available and by subsequently controlling direction of electrical current in the armature winding directly the direction of that initial torque is determined.

Disclosed herein is an electrical machine in which the armature means has only one phase winding, the width of the gap across the armature slots at the air-gap surface is narrower than the gap across the slots containing the field means so that flux from the field means alone causes the rotor to move to a position close to maximum torque position under energisation of both armature and field.

Disclosed herein is an electrical machine in which the armature means has only one phase winding, the gap across one or more field slots at the air-gap surface is narrower than the gap across the slot containing the armature means so that flux from the armature means alone causes the rotor to move to a position close to maximum torque position under energisation of both armature and field.

According to the invention in a first aspect, there is provided a flux switching electrical machine for converting electrical energy into mechanical energy and/or mechanical energy into electrical energy, the machine comprising: a stator; and a rotor, the stator having a field means for the creation of field flux and an armature assembly comprising at least one armature winding positioned in slots between stator teeth, the stator teeth extending radially towards an air-gap between stator and rotor, the rotor having teeth extending radially towards the air-gap between rotor and stator, each of at least two of the rotor teeth being manufactured to have different permeabilities parallel to and perpendicular to the air-gap, such that stator flux entering the rotor tooth from the air-gap sees a high reluctance in paths parallel to the air-gap and a low reluctance path, relative to the high reluctance path, in paths radial to the air-gap.

Optionally, the stator comprises armature slots carrying the armature means and field slots carrying the field means, wherein a width of a gap across the armature slot openings at the air-gap surface is different to the width of a gap across the field slot openings at the air-gap surface.

Optionally, the width of the gap across the armature slot openings at the air-gap surface is narrower than the width of the gap across the field slot openings at the air-gap surface.

Optionally, the width of the gap across the field slot openings at the air-gap surface is narrower than the width of the gap across the armature slot openings at the air-gap surface.

Optionally, the field means comprises one or more permanent magnets embedded within the stator, the armature slot openings being narrower than the field slot openings.

Optionally, the armature means comprises one armature winding and the electrical machine further comprises a control means configured to create an imbalance between armature and field excitation levels for causing the rotor to move to a position where the self inductance of the winding with higher energisation level is highest.

Optionally, the armature means comprises one armature winding and the electrical machine further comprises a control means configured to create an imbalance between armature and field excitation levels, such that the excitation level in the field means is substantially higher than the excitation level in the armature means excitation for a period of time sufficient to allow the rotor to turn to a position of maximum field flux for the given excitation.

The excitation level in the field means may comprise the number of turns in the field winding multiplied by the current in the field winding. The excitation level in the armature means may comprise the number of turns in the armature winding multiplied by the current in the armature winding Optionally, after the period of time of imbalanced excitation, the control means is configured to select the direction of armature current to select the direction of initial rotation of the rotor.

Optionally, the electrical machine may be configured to operate as a three-phase electrical machine.

Optionally, the rotor comprises five teeth.

According to the invention in a second aspect, there is provided a rotor for use in a flux switching electrical machine, and comprising: a plurality of teeth extending radially with respect to an axis of rotation of the rotor, wherein the magnetic permeability of at least one of tooth is higher in the radial direction than in a circumferential direction, across the at least one tooth.

Optionally, the at least one tooth comprises a high permeability section comprising a material having a magnetic permeability greater than that of air, and a low permeability section comprising a material having a magnetic permeability less than or equal to that of air.

Optionally, the low permeability sections comprise at least one slot formed within the tooth.

Optionally, the at least one slot has at least a section that is substantially parallel to a longitudinal axis of the tooth.

Optionally, the at least one slot has at least a section that is angled with respect to a longitudinal axis of the tooth.

Optionally, the rotor further comprises a central portion, from which the plurality of teeth extend radially outwards, wherein the at least one slots of adjacent teeth extend into the central portion to substantially connect the slots.

According to the invention in a third aspect, there is provided a stator for use in a flux switching electrical machine, and comprising: a plurality of field slots comprising a field winding and a plurality of armature slots comprising an armature winding, the field and armature slots positioned alternately around the stator, wherein each of the field and armature slots comprises an opening configured such that, when the stator is installed in an electrical machine, the opening faces an air-gap between the stator and a rotor, and wherein the width of the opening of the field slots is different to the width of the opening of the armature slots.

Optionally, the width of the opening of the field slots is greater than the width of the opening of the armature slots.

Optionally, the width of the opening of the field slots is less than the width of the opening of the armature slots.

According to the invention in a fourth aspect, there is provided an electrical machine comprising a rotor according as described above, a stator according as described above and further comprising a control means for controlling an inverter to provide excitation signals to the electrical machine, the control means being configured to create an imbalance between the excitation levels of the armature slots and field slots.

Optionally, control means is configured to provide an excitation level in the field slots substantially higher than the excitation level in the armature slots for a period of time sufficient to allow the rotor to turn to a position of maximum field flux for the given excitation.

According to the invention in a fifth aspect, there is provided an electrical machine comprising a stator as described above.

According to the invention in a fifth aspect, there is provided an electrical machine comprising a rotor as described above.

BRIEF DESCRIPTION OF THE FIGURES

Preferred embodiments of the present invention will now be explained with reference to the following Figures in which.

DESCRIPTION

Figure 6:
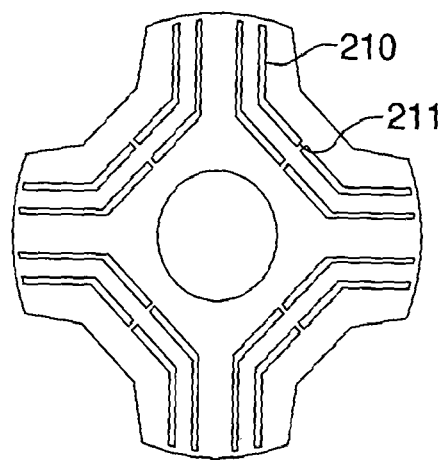
FIG. 6 shows a lamination of a rotor.

FIG. 6 shows a rotor. A slotted pattern has been cut into the rotor lamination. The slots 210 are shaped to enhance the 4 pole pattern on the rotor. These slots have introduced air between steel sections and therefore have high permeability. It is now much harder for flux to permeate at right angles to the slotting compared to permeating parallel to the slotting. In FIG. 6 there are 4 sets of slots within each rotor tooth and these are arranged in two pairs linking around to the corresponding pairs on the adjacent rotor teeth. Such slotting has been proposed for synchronous reluctance motors to improve the ratio between direct and quadrature inductances.

Its use in a flux switching motor has never been proposed because the introduction of air within the stator teeth would be considered detrimental to the inductance when the rotor teeth are in the aligned position with a set of stator teeth. In order to maintain mechanical rigidity it is useful to leave some material 211 bridging both sides of the rotor slotting at some points along its length.

Other forms of rotor slotting are possible as disclosed herein. Any number of slots can be considered. Small numbers one or two per rotor tooth require more careful placement and whilst they offer improved starting torque as will be discussed later, they have been found to have a detrimental effect on normal running torque. Higher numbers of 6 or more have been found to remove too much material from the tooth, particularly in small motors where the slot thickness becomes a significant percentage of the total tooth width.

It is also possible to have the slots sloping at an angle towards the air-gap. This will act in addition to stator asymmetry to aid the asymmetry of parking the rotor with the centre line of the rotor teeth away from the centre line of the stator teeth.

Figure 7:
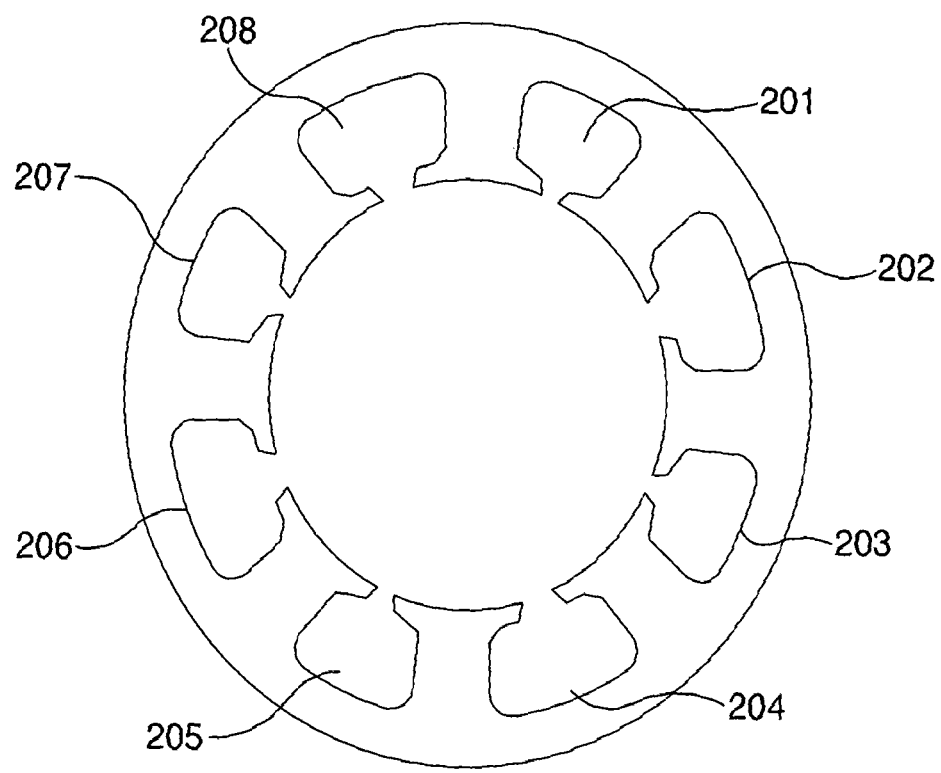
FIG. 7 shows laminations of a stator of a single phase flux switching machine.

FIG. 7 shows a stator lamination. In FIG. 7 the slots carrying the armature winding, 201, 203, 205, 207 have a decreased width at the air-gap surface compared to the slots of the field winding 202, 204, 206, 208. This asymmetric stator slot width has been found to be extremely beneficial when used with the rotor slotting in FIG. 6.

Figure 1:
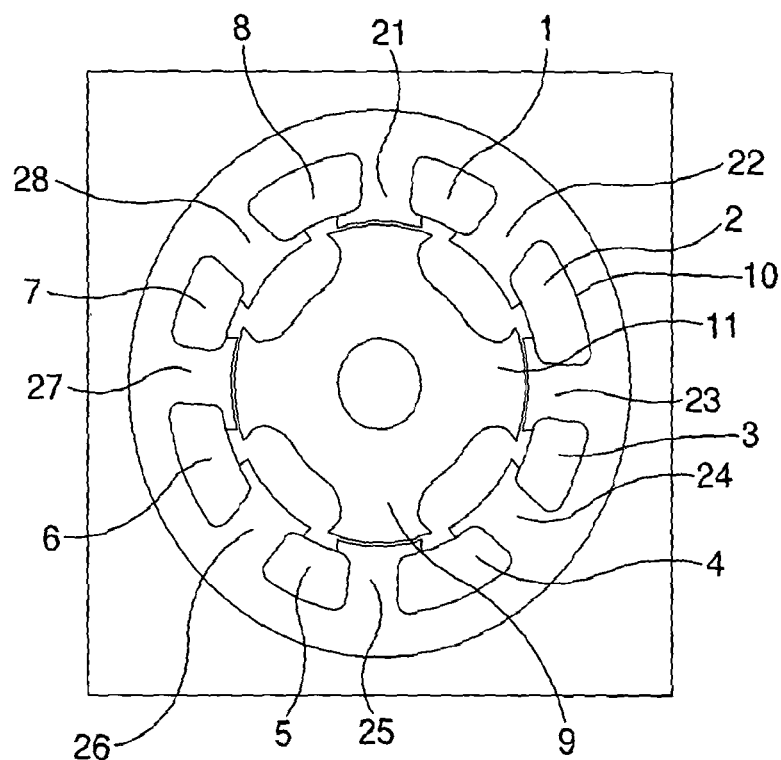
FIG. 1 and FIG. 2 show prior art single phase flux switching machines.
Figure 2:
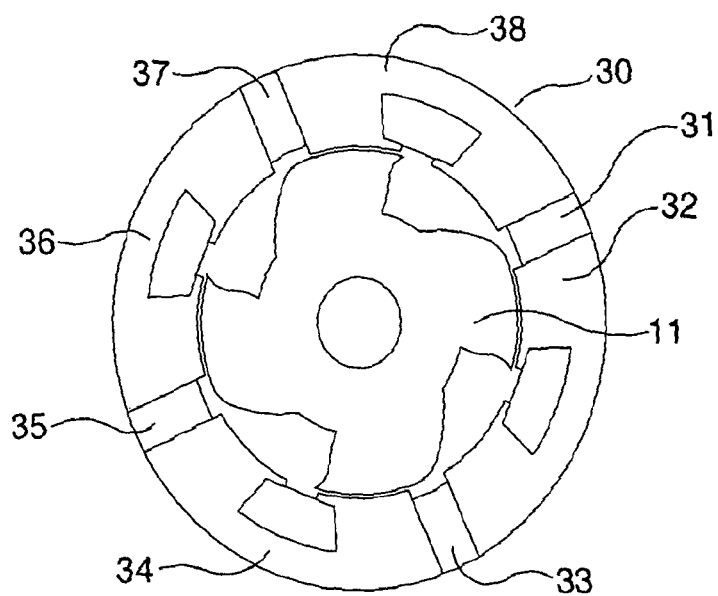
Figure 3:
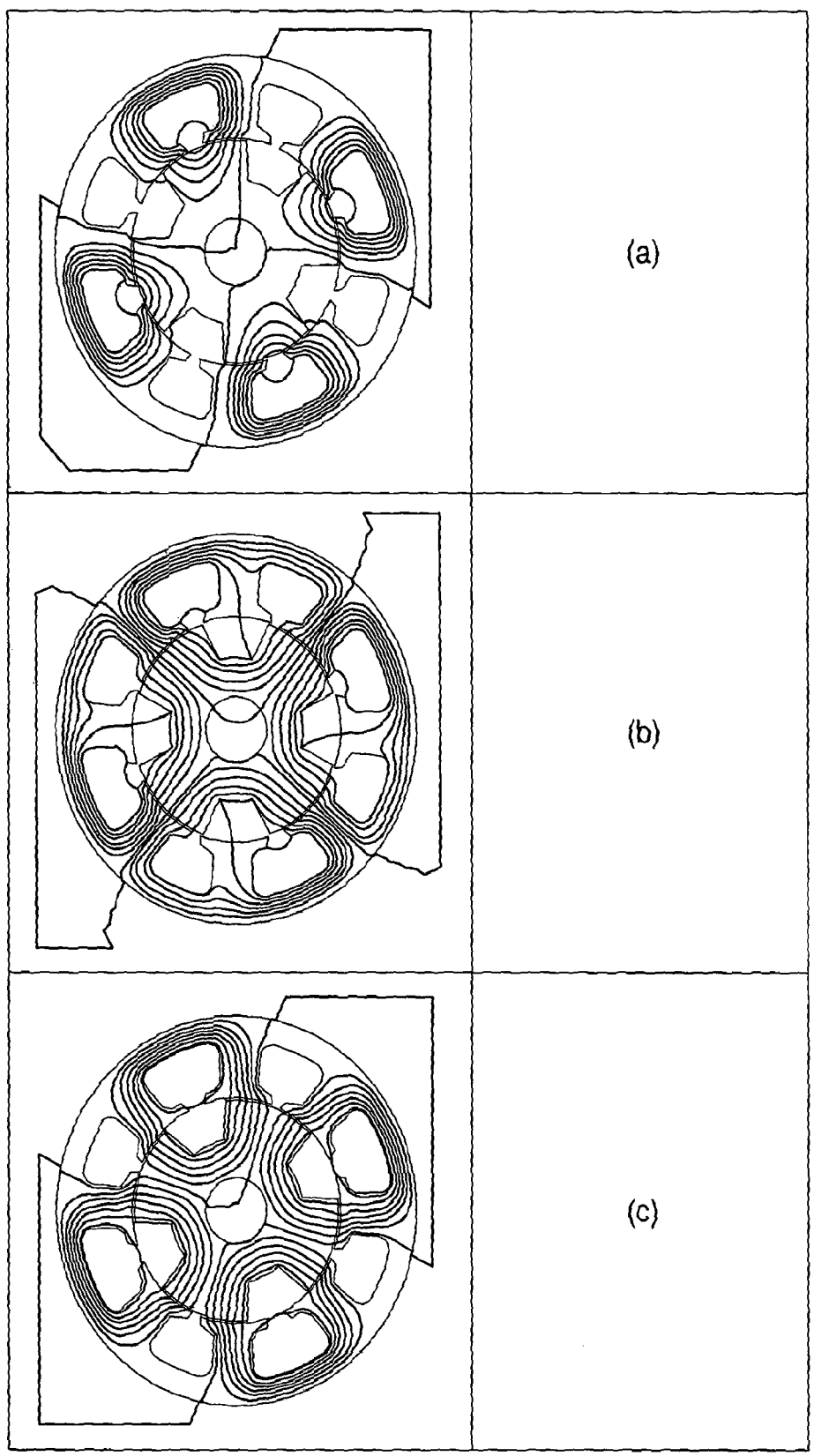
FIGS. 3(a)-3(c) show plots of the flux in prior art single phase flux switching machines at three different rotor positions when the field winding is excited.
Figure 8:
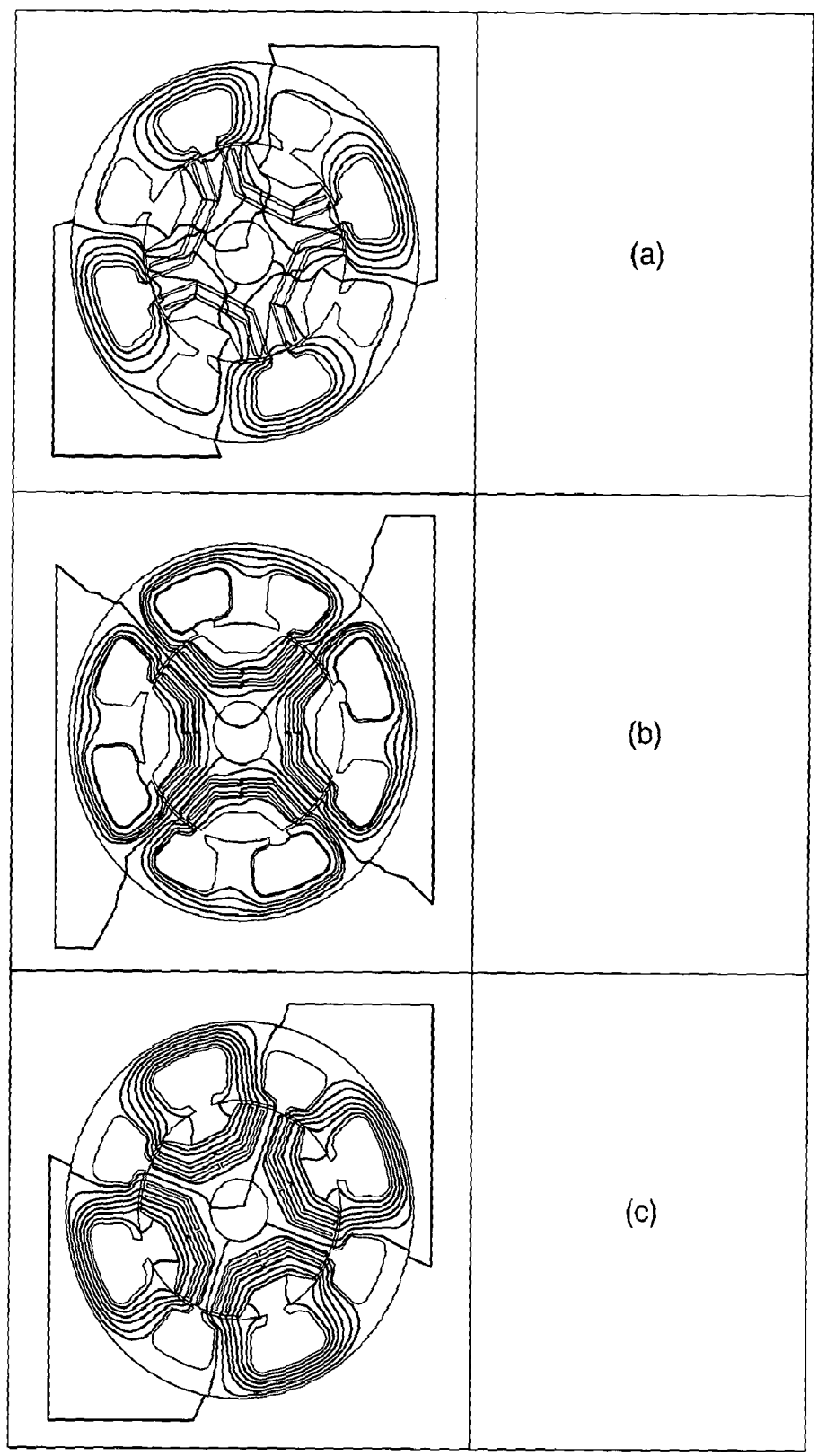
FIGS. 8(a)-(c) show flux plots of a single phase flux switching motor with the field winding excited at three different positions.

FIG. 8 shows flux plots of the rotor and stator illustrated in FIGS. 6 and 7 and incorporating the design features disclosed herein. These plots can also be compared with the same flux plots of prior art flux switching designs shown in FIG. 3. In each flux plot only the field winding is excited (slots 202, 203, 204 and 208 in FIG. 7) to observe the variation in field flux linkage with position. In FIG. 8(a) the rotor teeth are in a position where they bridge the four stator slots containing the energised field winding. In this plot the rotor slotting acts as a high permeability to the field flux. The flux paths which would normally pass across the surface of the rotor teeth are impeded. The flux linkage per unit field current in this position is lower than a prior art flux switching motor.

In FIG. 8(b) the rotor teeth are aligned with one group of four stator teeth. In this position the flux lines travel substantially in parallel to the 4 pole flux paths. The rotor slotting has a minimal impact on the flux linkage per unit current when the rotor is in this position.

In FIG. 8(c) the rotor teeth are in a position where they bridge the four stator slots containing the un-energised armature winding. In FIG. 8(c) the rotor teeth are bridging the stator slots with the narrower slot opening. In this position the narrower stator slot opening results in a greater surface area of the rotor tooth overlapping a stator tooth compared to a prior art flux switching motor. Also the direction of the rotor slotting does not impede the field flux linkage. This position is now associated with a much higher flux linkage than FIG. 8(a).

Figure 4:
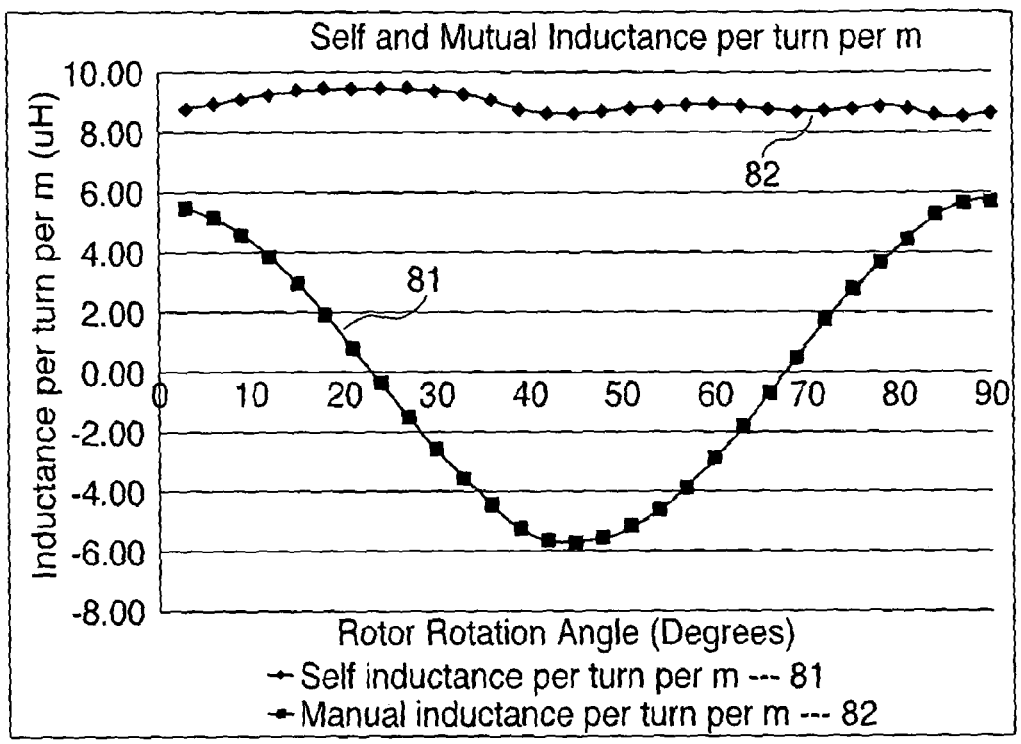
FIG. 4 shows a plot of the variation in self and mutual inductance in the field and armature windings of a typical prior art single phase flux switching machine such as the one shown in FIG. 1.
Figure 5:
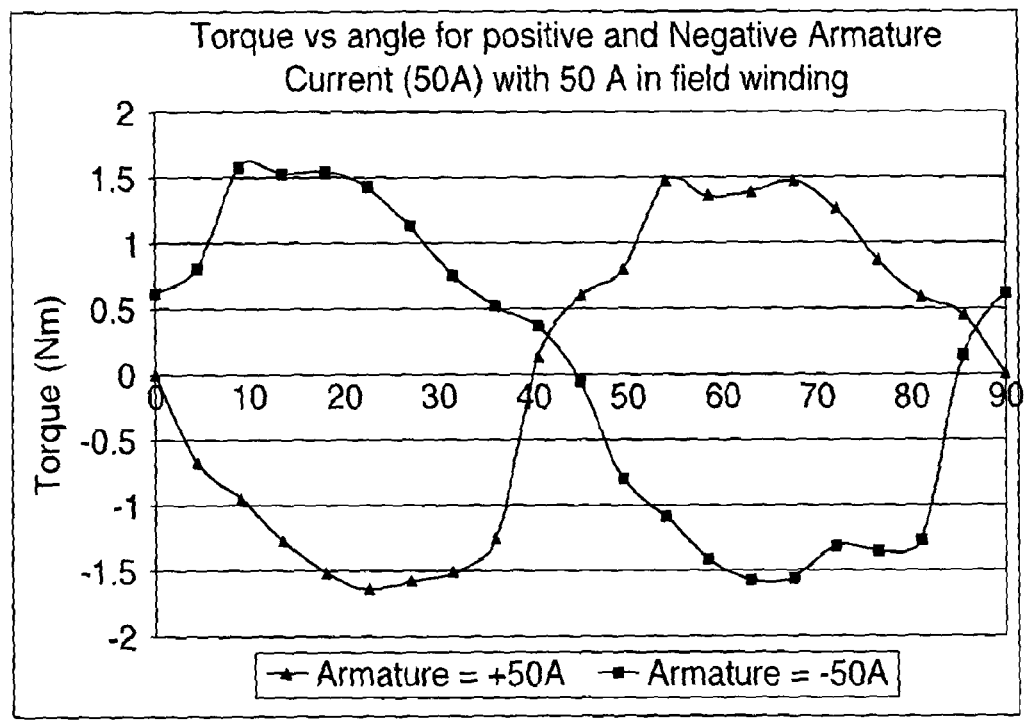
FIG. 5 shows a plot of torque variation with angle over an electrical cycle with alternate polarities of armature current.
Figure 9:
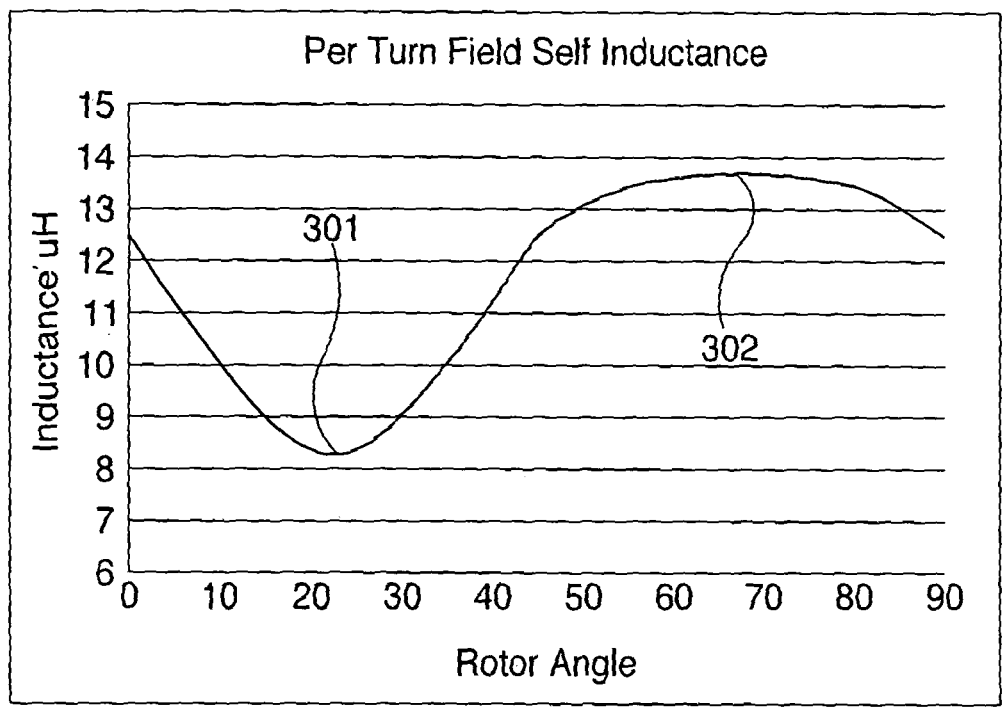
FIG. 9 shows a plot of the variation in self inductance in the field winding of a single phase flux switching machine.

FIG. 9 shows a plot of the self inductance (per turn) of the field winding in a flux switching motor. Compared to the plot of FIG. 4 for a prior art motor there is now a significant variation in the self inductance of the field winding, The low value, 301, at 22.5° is substantially due to the rotor slotting in position of FIG. 8(*a*). The high value, 302, at 67.5° is not impeded by rotor slotting and is improved by the narrower slot openings associated with the armature slots. As a result of this significant variation in the self inductance of the field winding it is now possible to develop a position dependent torque by arranging for field current to flow without armature current. Under these conditions the rotor will be attracted to the position of maximum inductance, 302, (FIG. 8(*c*) or 67.5°.

Figure 10:
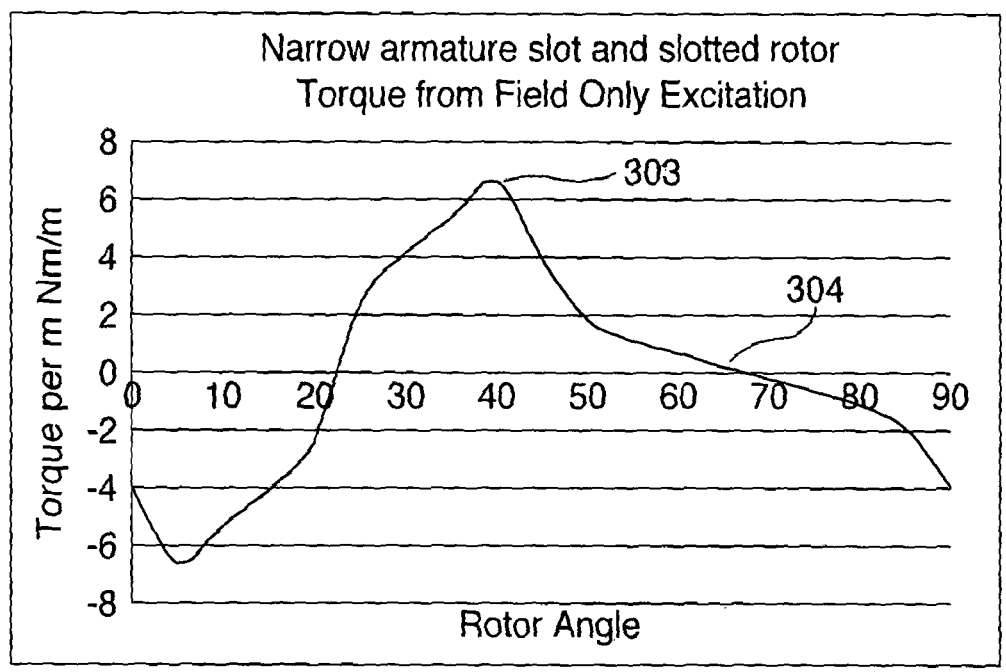
FIG. 10 shows torque variation with angle in a single phase flux switching motor with field only excitation.

This is confirmed by the torque plot in FIG. 10 which shows a large positive torque, 303, at 45°. This is a position where it was difficult to generate any torque in a prior art flux switching motor. The positive torque will cause rotation of increasing angle until the torque drops to zero, indicating a point of stable equilibrium, 304, at 67.5°. The graph of FIG. 10 only crosses the x-axis with a negative slope at one position in each electrical cycle. There is therefore only one stable position with field only excitation.

Once the rotor of a flux switching machine has been moved towards the 67.5° point, (FIG. 8(*c*)) it is now in the ideal position to produce positive (anti-clockwise) torque or negative (clockwise) torque. This point is actually the point of maximum torque per amp of armature current and is therefore a secure way of guaranteeing starting in either direction.

Figure 11:
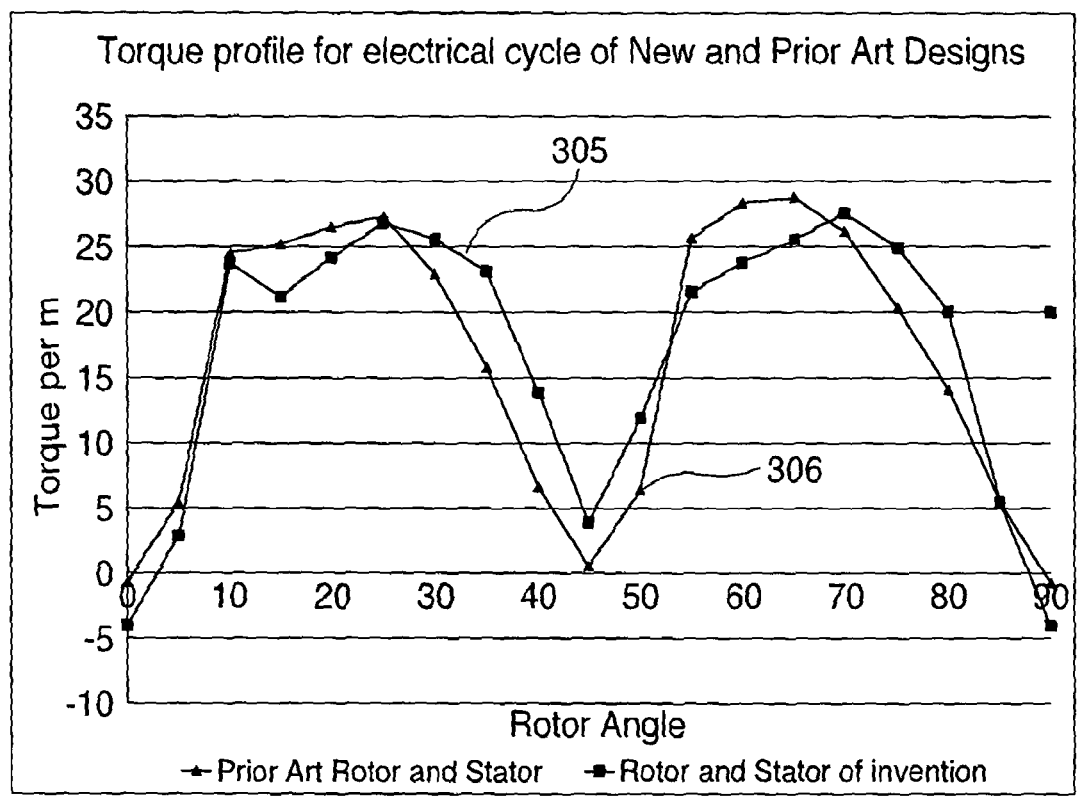
FIG. 11 shows torque variation with angle in a single phase flux switching motor operating with field and alternating armature current.

FIG. 11 shows the plot of a flux switching motor, 305, compared to a prior art flux switching motor, 306. The armature currents decrease to zero and reverse polarity every 45°. At 0°, 45° and 90° the prior art flux switching motor has negligible torque. At 0° and 90°, the flux switching motor has negative torque due to the field only excitation but this is positive at 45°. Significantly the region between 30° and 45° and between 70° and 85° is characterised by a considerable increase in torque output from the flux switching machine. This proves that the additional air spaces within the rotor teeth have actually improved the torque profile of the machine in addition to providing a method to guarantee starting in either direction.

Figure 12:
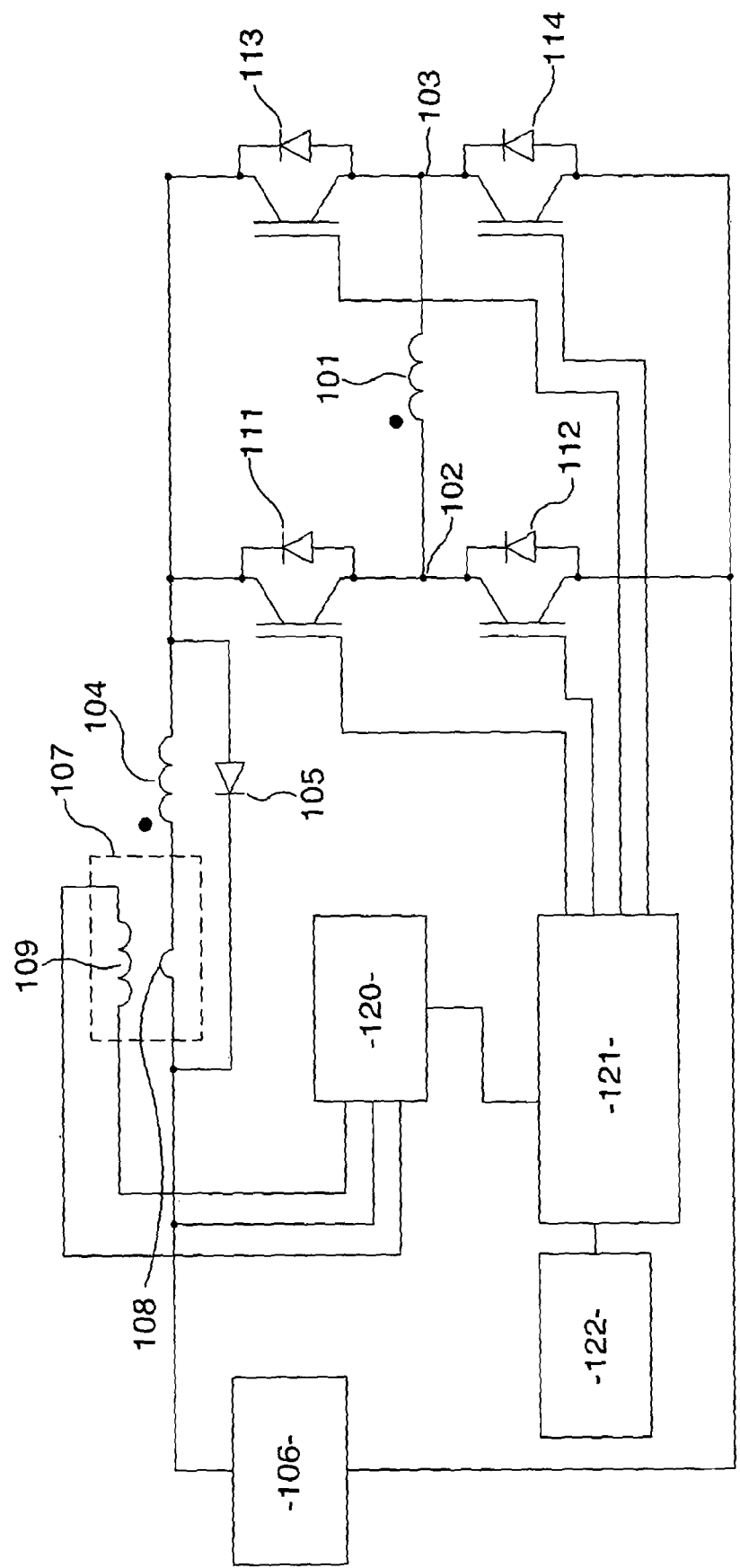
FIG. 12 shows a control circuit for a prior art single phase flux switching machine which can be employed to control a motor.

FIG. 12 shows a control circuit for a flux switching machine which can be used to start a flux switching motor. An armature winding 101 of a flux switching motor is connected to the first 102 and second 103 switching nodes of a power electronic inverter. Each leg of the inverter comprises two power electronic switches. FIG. 12 shows these switches as insulated gate bipolar transistors though MOSFETs or other semiconductor switches can be used. The field winding 104 of the flux switching motor is connected in series with the power supply connection to the power electronic inverter. A diode 105 around the field winding provides an additional current path when field current is greater than armature current or when armature switches are turned off. The whole circuit is connected to a power source 106 which may be dc, such as a battery, or may be a dc power supply created from the rectification of an ac power supply. In either case, it is not necessary for the dc power source to be smooth or constant. If the power supply is derived from rectification of an ac power supply it will be common to find a significant modulation of the dc voltage being supplied to the motor circuit.

FIG. 12 also contains a differentiating coil 107 for providing a signal related to the rate of change of the field current flowing in the field winding 104, as disclosed in WO 2004/025822. The primary 108 of the differentiating coil is in series with the field winding 104 and carries the field current. The secondary 109 of the differentiating coil 107 links the flux associated with the field current flowing in the primary 108 and is connected to the sensorless conditioning circuit 120, details of which will be described later. The voltage across the secondary of the differentiator coil 107 is therefore directly related to the rate of change of field current. The signals produced by the sensorless conditioning circuit 120 are passed to a signal controller 121. The signal controller 121 also receives information from an application controller 122 which may be as simple as on/off commands but in more complex motor drives may issue requests for operating speeds or operating torques. The signal controller 121 uses the information from the sensorless conditioning circuit 120 to determine the required switching states of the switches 111, 112, 113 and 114 in the power electronic inverter, in order to control the motor to follow as closely as possible to the requirements of the application controller 122.

The operation of the circuit in FIG. 12 will now be described. In order to start a flux switching motor, the inverter switches are used in an unconventional way. If both switch 111 and 112 are turned on simultaneously. Current can flow from the supply 106, through the field winding 104. Switching off one or both of the switches causes current in field winding 104 to circulate in diode 105. The field current can therefore be established within the field winding slots by modulating the shoot through path of the inverter. Under these conditions the field current magnitude can be increased or decreased by the duty ratio of the conducting pair of switches. No significant armature current will flow other than a small induced current. While in this mode the rotor will be pulled round to a position near the FIG. 8(*c*). Once near this position, even if oscillation is still occurring it is possible to use a diagonal pair of armature switches to select positive or negative armature current and obtain a guaranteed direction of starting torque. Once rotation has been established the sensorless methods using the differentiating coil 107 can be used to maintain operation in the required direction. The circuit configured to turn on both switches in one leg of an inverter simultaneously to modulate the current in the field.

Figure 13:
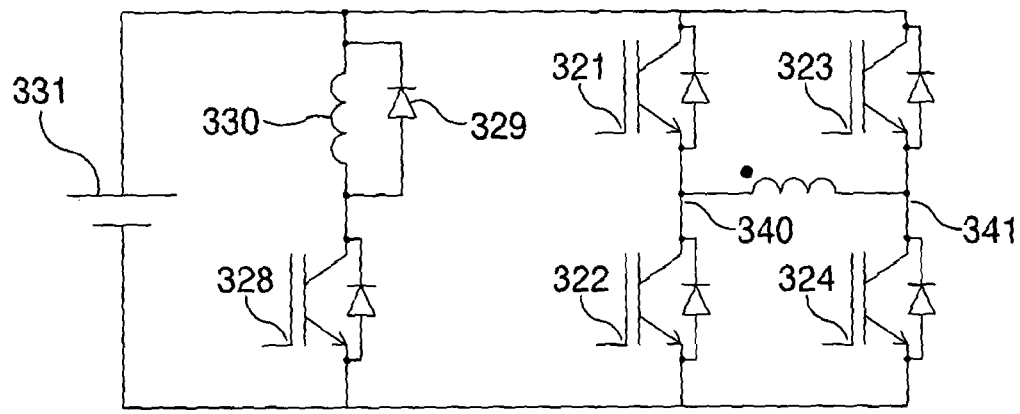
FIG. 13 shows a further control circuit for a single phase flux switching motor which can be used to control a motor.

Other power electronic circuits can be used. A separately excited armature and field winding with their own independent control can be controlled in the correct sequence. FIG. 13 shows a further control circuit for separately exciting the field and armature windings of a single phase flux switching motor. The armature circuit employs four IGBTs (or MOSFETs or other transistor switch) 321, 322, 323 and 324 connected to the first end 340 and second end 341 of the armature winding. A further IGBT 328 controls the current through the shunt field winding 330. A diode 329 carries the field current when the IGBT 328 is turned off. The whole circuit is connected to a dc power source 331. The dc power source may be a battery or may be the output from a rectifier to convert ac to dc.

In one exemplary implementation, this circuit can be used to start a single phase flux switching motor in either direction. Field only excitation can be controlled by appropriate modulation of IGBT 328. During this time the rotor of a single phase flux switching motor as herein disclosed will be pulled into a position where the field inductance is maximised. Once this has been achieved, energisation of the armature with either positive or negative current can be achieved with energisation of IGBT pair 321 and 324 or IGBT pair 322 and 323. As a different torque direction is created by each direction of armature current the motor disclosed herein can have a guaranteed direction at starting.

Another arrangement known from the prior art uses the field winding as part of an input filter. In such cases the initial in-rush current to the filter capacitors could move the rotor to the required starting position and the armature excitation then starts the motor.

Furthermore, if an electronic circuit can energise armature windings without field current then it is possible to have a reduced slot width on the field slot and achieve a similar parking position at 22.5°.

The methods and apparatuses disclosed herein are particularly suited to the single phase permanent magnet flux switching motor because the field flux is always present in the machine. If the armature slot openings are arranged to be narrower than the field slots containing the permanent magnets, then when the armature energisation is switched off to bring the motor to rest the rotor will stop in a position where the rotor teeth are bridging the armature slots and the field flux is at its maximum. From this position starting in either direction is possible with maximum torque with the correct choice of armature current polarity.

The figures in this description have all shown 4 pole versions of the single phase flux switching motor. The methods and apparatuses disclosed herein can be applied to flux switching motors of any pole number with 2 and 6 also being common.

Figure 14:
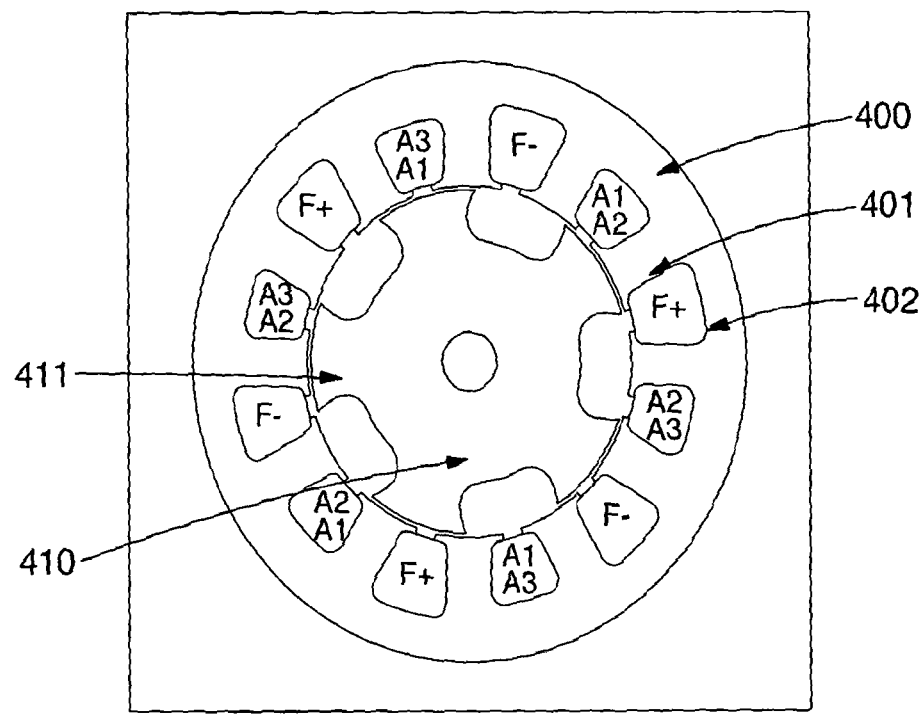
FIG. 14 shows the stator and rotor of a flux switching motor according to the prior art with a field winding and three armature phase windings.

FIG. 14 shows the stator and rotor of a flux switching motor according to the prior art with a field winding and three armature phase windings.

A stator 400 has 12 teeth 401 and 12 slots 402 between the teeth. The stator slots carry stator windings. Six of the slots carry field windings, each field slot carrying a current in the opposite direction to the next field slot, to create a six pole magnetic field. The other six slots carry three phase windings or armature windings, $A_1$, $A_2$ and $A_3$. The rotor 410 of the flux switching machine is made of laminated steel and carries no windings or permanent magnets. In this example the rotor has five teeth 411. With field current supplied to the field winding, rotation of the rotor within the stator induces three alternating voltages 120° apart. If the three armature phase windings are connected to a three phase inverter and armature currents are delivered to the windings in synchronism with the induced EMF continuous motoring or generating is achieved. Flux switching motors in which the field winding is replaced by permanent magnets are also known in the prior art.

Figure 15:
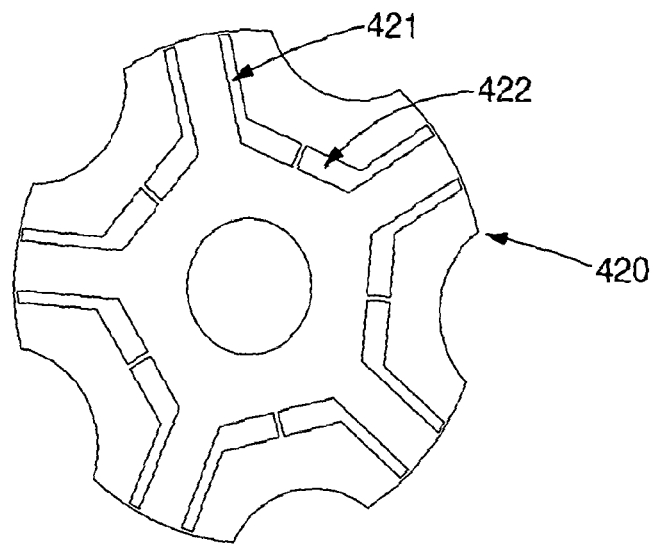
FIG. 15 shows a rotor for a flux switching motor with three armature phases.

FIG. 15 shows a rotor for a flux switching motor with three armature phases incorporating a design improvement. The rotor has five teeth 420 as in the prior art design. However, the addition of the slots 421 create the lower permeability across the tooth parallel to the air-gap and higher permeability within the tooth perpendicular to the air-gap. Flux entering the rotor tooth from the stator is therefore encouraged to follow a path which takes it to another rotor tooth rather than travelling along the surface of the rotor tooth and back into the stator. FIG. 15 shows two symmetrically positioned slots within each rotor tooth. As with the single phase flux switching motor the number of rotor slots can be increased to create further improvements in the torque ripple of the machine.

Figure 16:
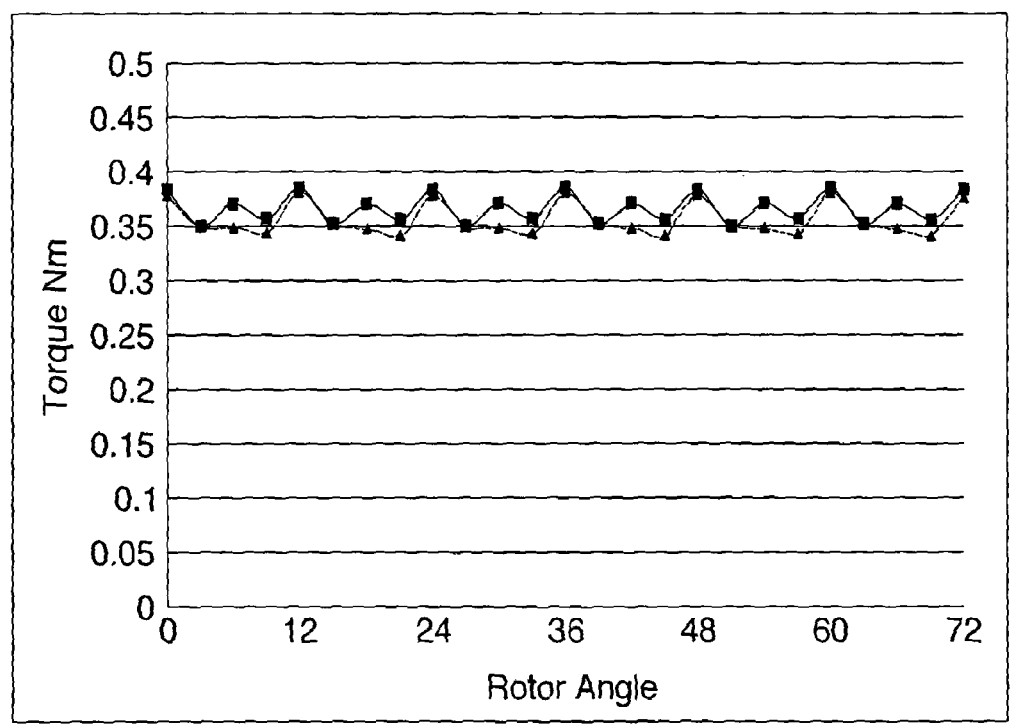
FIG. 16 shows a graph of the flux variation over one electrical cycle of rotation in a three phase flux switching motor compared to a similar result in a prior art three phase flux switching motor.

The result of modifying the rotor of a three phase flux switching motor as disclosed herein can be seen in the graph in FIG. 16. The graph compares a motor according to the prior art with the torque output of a motor designed as herein disclosed. The dashed line 450 on the graph is a three phase flux switching motor according to the prior art with no slotting on the rotor. The solid line 451 is the result obtained when the rotor is modified as illustrated by FIG. 15. All other dimensions of the rotor and stator remain unchanged with the exception of the slots in the rotor.

As a result of the methods and apparatuses disclosed herein, the torque output of the motor has been increased by 3% while the peak to peak ripple of the torque has been significantly reduced. In the same way as the addition of the slotting has improved the torque profile of the single phase flux switching motor the benefit to average torque and torque ripple is also evident in three phase motors modified according to the invention.

The three phase flux switching machine with twelve slots in the stator and/or rotor can also be constructed with a rotor having seven teeth. Such a rotor can have internal slots within each rotor tooth to decrease the permeability across the tooth parallel to the air-gap and to maintain high permeability in a path perpendicular to the air-gap linked to adjacent rotor teeth.

The three phase flux switching motor is also commonly found with twenty-four teeth on the stator and ten or fourteen rotor teeth. Such a rotor can also have slots to decrease the permeability of the teeth in the direction parallel to the air-gap and maintain high permeability in a path linking two adjacent rotor teeth.

The stators of all three phase flux switching motors can also have permanent magnet sections forming all or part of the field sections of the stator.

Figure 17:
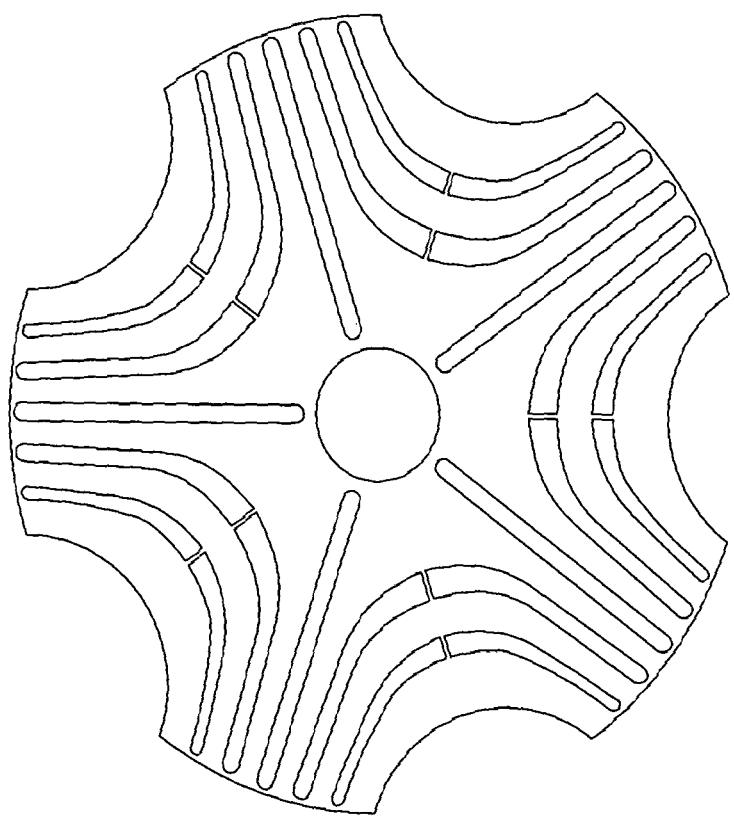
FIG. 17 shows a lamination of a rotor.

The methods and apparatuses disclosed herein are not limited to the use of an even number of slots within each rotor tooth. It is also very effective to have an odd number of slots within each rotor tooth as shown in FIG. 17. In the exemplary rotor of FIG. 17, there are five rotor teeth. Within each rotor tooth there are five slots. Four of the slots link to equivalent positions in adjacent rotor teeth. One slot located more centrally within the rotor tooth may not link directly to the adjacent rotor tooth but can terminate at the shaft, leaving a small thickness of steel to hold the rotor lamination in one piece. This more centrally located slot also acts to decrease the permeability of the flux path across the tooth parallel to the air-gap but does not decrease the flux path linking adjacent rotor teeth.

A further implementation may only have one slot per rotor tooth in a position between the tooth surface and the shaft.

In this description reference has been made to field only or armature only excitation. The methods and apparatuses disclosed herein will work providing there is a significant imbalance between the currents. One current does not have to be zero.

The skilled person will be able to envisage further embodiments without departing from the scope of the appended claims.

The invention claimed is:

1. A flux switching electrical machine for converting electrical energy into mechanical energy and/or mechanical energy into electrical energy, the machine comprising:
   a stator; and
   a rotor,
      the stator having a field means for the creation of field flux and an armature assembly comprising at least one armature winding positioned in slots between stator teeth,
      the stator teeth extending radially towards an air-gap between stator and rotor,
      the rotor having teeth extending radially towards the air-gap between rotor and stator, each of at least two of the rotor teeth being manufactured to have different permeabilities parallel to and perpendicular to the air-gap, such that stator flux entering the rotor teeth from the air-gap sees a high reluctance in paths parallel to the air-gap and a low reluctance path, relative to the high reluctance path, in paths radial to the air-gap;

wherein each of the teeth on the rotor comprises a high permeability section comprising a material having a magnetic permeability greater than that of air, and a low permeability section comprising a material having a magnetic permeability less than or equal to that of air, and the low permeability section comprises at least one slot formed within the tooth;

and wherein the rotor comprises a central portion, from which the teeth extend radially outwards, wherein the at least one slots of adjacent teeth extend into the central portion to substantially connect the slots.

2. The electrical machine according to claim 1, wherein the stator comprises armature slots carrying the armature means and field slots carrying the field means, wherein a width of a gap across the armature slot openings at the air-gap surface is different to the width of a gap across the field slot openings at the air-gap surface.

3. The electrical machine according to claim 2, wherein the width of the gap across the armature slot openings at the air-gap surface is narrower than the width of the gap across the field slot openings at the air-gap surface.

4. The electrical machine according to claim 2, wherein the width of the gap across the field slot openings at the air-gap surface is narrower than the width of the gap across the armature slot openings at the air-gap surface.

5. The electrical machine according to claim 1, wherein the field means comprises one or more permanent magnets embedded within the stator, the armature slot openings being narrower than the field slot openings.

6. The electrical machine according to claim 1, wherein the armature means comprises one armature winding and the electrical machine further comprises a control means configured to create an imbalance between armature and field excitation levels for causing the rotor to move to a position where the self inductance of the winding with higher energisation level is highest.

7. The electrical machine according to claim 1, wherein the armature means comprises one armature winding and the electrical machine further comprises a control means configured to create an imbalance between armature and field excitation levels, such that the excitation level in the field means is substantially higher than the excitation level in the armature means excitation for a period of time sufficient to allow the rotor to turn to a position of maximum field flux for the given excitation.

8. The electrical machine according to claim 7, wherein, after the period of time of imbalanced excitation, the control means is configured to select the direction of armature current to select the direction of initial rotation of the rotor.

9. The electrical machine according to claim 1 configured to operate as a three-phase electrical machine.

10. The electrical machine according to claim 9, wherein the rotor comprises five teeth.

11. The electrical machine according to claim 1, wherein the at least one slot has at least a section that is substantially parallel to a longitudinal axis of the tooth.

12. The electrical machine according to claim 1 and further comprising a control means for controlling an inverter to provide excitation signals to the electrical machine, the control means being configured to create an imbalance between the excitation levels of the armature slots and field slots.

13. The electrical machine according to claim 12, wherein the control means is configured to provide an excitation level in the field slots substantially higher than the excitation level in the armature slots for a period of time sufficient to allow the rotor to turn to a position of maximum field flux for the given excitation.

14. The electrical machine according to claim 12, wherein the control means is configured to turn on first and second switches in one leg of an inverter simultaneously to modulate the current in the field slots.

15. A flux switching electrical machine for converting electrical energy into mechanical energy and/or mechanical energy into electrical energy, the machine comprising:
   a stator; and
   a rotor,
   the stator having a field means for the creation of field flux and an armature assembly comprising at least one armature winding positioned in slots between stator teeth,
   the stator teeth extending radially towards an air-gap between stator and rotor,
   the rotor having teeth extending radially towards the air-gap between rotor and stator, each of at least two of the rotor teeth being manufactured to have different permeabilities parallel to and perpendicular to the air-gap, such that stator flux entering the rotor teeth from the air-gap sees a high reluctance in paths parallel to the air-gap and a low reluctance path, relative to the high reluctance path, in paths radial to the air-gap;
   wherein each of the teeth on the rotor comprises a high permeability section comprising a material having a magnetic permeability greater than that of air, and a low permeability section comprising a material having a magnetic permeability less than or equal to that of air, and the low permeability section comprises at least one slot formed within the tooth;
   and wherein the at least one slot has at least a section that is angled with respect to a longitudinal axis of the tooth.

* * * * *

UNITED STATES PATENT AND TRADEMARK OFFICE
CERTIFICATE OF CORRECTION

| | |
|---|---|
| PATENT NO. | : 9,577,479 B2 |
| APPLICATION NO. | : 14/007322 |
| DATED | : February 21, 2017 |
| INVENTOR(S) | : Charles Pollock and Helen Pollock |

It is certified that error appears in the above-identified patent and that said Letters Patent is hereby corrected as shown below:

Title: replace "IMPROVEMENTS FOR FLUX SWITCHING MACHINES" with -- DESIGN IMPROVEMENTS FOR FLUX SWITCHING MACHINES --

Signed and Sealed this
Fifteenth Day of August, 2017

Joseph Matal
*Performing the Functions and Duties of the
Under Secretary of Commerce for Intellectual Property and
Director of the United States Patent and Trademark Office*